United States Patent
Kalombo et al.

(10) Patent No.: US 12,401,303 B2
(45) Date of Patent: Aug. 26, 2025

(54) LOW ACOUSTIC NOISE OPEN LOOP MOTOR STARTUP

(71) Applicant: Allegro MicroSystems, LLC, Manchester, NH (US)

(72) Inventors: Simon Kalombo, Rozzano MI (IT); Emanuele Gallazzi, Milan (IT); Masahira Kurihara, Edinburgh (GB); Andrea Foletto, Andorno Micca (IT)

(73) Assignee: Allegro MicroSystems, LLC, Manchester, NH (US)

( * ) Notice: Subject to any disclaimer, the term of this patent is extended or adjusted under 35 U.S.C. 154(b) by 160 days.

(21) Appl. No.: 18/463,443

(22) Filed: Sep. 8, 2023

(65) Prior Publication Data
US 2025/0088130 A1    Mar. 13, 2025

(51) Int. Cl.
| | | |
|---|---|---|
| H02P 21/34 | (2016.01) | |
| H02P 21/13 | (2006.01) | |
| H02P 21/18 | (2016.01) | |
| H02P 21/22 | (2016.01) | |

(52) U.S. Cl.
CPC .............. *H02P 21/34* (2016.02); *H02P 21/13* (2013.01); *H02P 21/18* (2016.02); *H02P 21/22* (2016.02)

(58) Field of Classification Search
CPC .......... H02P 21/34; H02P 21/13; H02P 21/18; H02P 21/22; H02P 27/08
See application file for complete search history.

(56) References Cited

U.S. PATENT DOCUMENTS

| | | | |
|---|---|---|---|
| 9,203,339 B2 | 12/2015 | Sato | |
| 9,887,653 B2 | 2/2018 | Ross et al. | |
| 9,929,683 B2 | 3/2018 | Sonoda et al. | |
| 10,312,847 B2 | 6/2019 | Lu | |
| 10,696,141 B2 * | 6/2020 | Kashima | B60H 1/3222 |
| 11,387,756 B1 | 7/2022 | Khosravi et al. | |

(Continued)

FOREIGN PATENT DOCUMENTS

| | | | | |
|---|---|---|---|---|
| JP | 2008229151 A | * | 10/2008 | ........... D06F 58/206 |
| KR | 20140116728 | | 10/2014 | |

OTHER PUBLICATIONS

Corrected Notice of Allowability dated Aug. 16, 2022 for U.S. Appl. No. 17/371,409; 7 Pages.

(Continued)

*Primary Examiner* — Bickey Dhakal
(74) *Attorney, Agent, or Firm* — DALY, CROWLEY, MOFFORD & DURKEE, LLP (57) ABSTRACT

Methods and apparatus for motor startup with reduced acoustic noise include a startup module to generate a startup d-axis voltage during a startup interval and a startup q-axis voltage during the startup interval, wherein the startup interval ends at a time based on the observer error, and wherein the startup q-axis voltage increases during the startup interval. The startup module is configured to continuously linearly increase the speed of the motor during the startup interval. An observer generates a speed estimate, an angle estimate, and an observer error representative of a difference between an actual angle and the angle estimate. A voltage increment by which the startup q-axis voltage is increased during the startup interval is adjusted based on the observer error. The voltage increment can be equal to a constant value plus the observer error.

20 Claims, 9 Drawing Sheets

(56) References Cited

U.S. PATENT DOCUMENTS

| | | |
|---|---|---|
| 11,476,784 B1 | 10/2022 | Kurihara et al. |
| 2009/0256507 A1 | 10/2009 | Thompson et al. |
| 2009/0315492 A1* | 12/2009 | Oomura ............... H02P 6/20 |
| | | 318/400.11 |
| 2010/0164428 A1 | 7/2010 | Xu et al. |
| 2014/0285127 A1* | 9/2014 | Kang .................. H02P 21/34 |
| | | 318/400.11 |
| 2018/0159455 A1 | 6/2018 | Pietromonaco |
| 2018/0367073 A1 | 12/2018 | Haas |
| 2019/0013750 A1 | 1/2019 | Leman et al. |
| 2020/0395876 A1 | 12/2020 | Greiner |

OTHER PUBLICATIONS

International Search Report and Written Opinion of the ISA dated Sep. 30, 2022 for International Application No. PCT/US2022/033572; 13 Pages.

Notice of Allowance dated Aug. 5, 2022 for U.S. Appl. No. 17/371,409; 10 Pages.

Wang, et al.; "A Simple Startup Strategy Based on Current Regulation for Back-EMF-Based Sensorless Control of PMSM"; IEEE Transactions on Power Electronics; vol. 27; No. 8; pp. 3817-3825; Aug. 2012; 9 Pages.

Wang, et al.; "An Improved 3-Step Startup Method Based on Sensorless Vector Control of PMSM"; 2019 IEEE PES Asia-Pacific Power and Energy Engineering Conference (APPEEC); Dec. 1-4, 2019; 5 Pages.

* cited by examiner

LOW ACOUSTIC NOISE OPEN LOOP MOTOR STARTUP

BACKGROUND

Circuits to control and drive brushless DC (BLDC) electric motors are known. Conventional BLDC motor control techniques may employ BEMF (back emf) information for position estimation, however, BEMF information is not available at zero speed, for example, at motor startup. A conventional startup technique is to drive the motor in open-loop, without position estimation (e.g., align and go for example), which may cause reverse rotation during startup. In addition, this technique may increase startup time if a relatively conservative startup profile is chosen or render motor startup unreliable if an aggressive startup profile is chosen.

Some three-phase BLDC motor startup techniques can use sensors, such as Hall effect elements, to detect position and/or speed of the motor for use by the controller. These types of systems can be referred to as "sensor-based" systems. One motor type that generally employs a sensor-based control system is a permanent magnet synchronous motor (PMSM).

In other motor control systems, separate sensors are not used to detect the motor position and/or speed and thus, such systems are sometimes referred to as "sensorless systems." Such systems include electronic circuitry to estimate motor position and/or speed.

The various startup techniques may have advantages and disadvantages. For example, a conventional Hall effect sensor-based startup configuration typically has three Hall effect elements, one for each phase. Hall effect sensor configurations may provide relatively reliable and fast startup, and adaptation to different motors and load conditions without changing the parameters for the controller. However, typical Hall effect sensor startup techniques produce a rectangular current in which the changing phases of the current is relatively unsmooth so as to generate acoustic noise.

Conventional sensorless control of motor startup is open-loop to generate enough torque to spin up the motor from static friction since the start-up torque needs to be higher than normal operation current in sensorless operation. In such systems, the startup current needs to be high enough to achieve the startup.

Some sensorless motor control systems implement Field Oriented Control (FOC) in which the control causes the stator and rotor magnetic fields to be orthogonal to each other to achieve the maximum electromagnetic torque. However, there can be relatively high current and ripple during the transition from open-loop operation to closed-loop operation due to misalignment of the applied starting current and the actual motor current. Such high current and ripple can cause undesirable acoustic noise.

In the automotive industry, motor control is often sensorless control due to reliability and cost. Also there is a need for quieter motor operation for electric vehicles (EV) and hybrid electric vehicles (HEV). Motor acoustic noise generated in combustion engines is less problematic than in electric vehicles. However, quiet motor operation is required especially when a combustion engine is stopped.

SUMMARY

Described herein are structures and methods directed towards motor startup control in a manner that results in optimal transitioning from open-loop startup control to closed-loop operation in terms of minimizing acoustic noise without increasing the startup interval duration. The described advantages are achievable in both a passive startup control mode in which a startup q-axis voltage is increased during a portion of the startup interval and in an active startup control mode in which the startup q-axis voltage is increased by an increment that is adjusted based on an observer error.

The present disclosure provides a motor control system for controlling operation of a motor having a plurality of windings, including a gate driver to provide a control signal to one or more switching elements controlling a voltage applied to the plurality of windings and a controller configured to generate a PWM signal based on a received demand signal for coupling to the gate driver, wherein the controller comprises a d-axis control loop configured to generate an applied d-axis voltage and a q-axis control loop configured to generate an applied q-axis voltage. The controller includes an observer and a startup module. The observer is configured to generate a speed estimate, an angle estimate, and an observer error representative of a difference between an actual angle and the angle estimate. The startup module is configured to generate a startup d-axis voltage that provides the applied d-axis voltage during a startup interval and a startup q-axis voltage that provides the applied q-axis voltage during the startup interval, wherein the startup interval ends at a time based on the observer error, and wherein the startup q-axis voltage increases during the startup interval.

Features of the disclosure may include one or more of the following, alone or in combination. The startup module can be further configured to continuously linearly increase the speed of the motor during the startup interval. A voltage increment by which the startup q-axis voltage Vqs is increased during the startup interval can be adjusted. The voltage increment can be adjusted based on the observer error. The voltage increment can be equal to a constant value plus the observer error. The startup interval can include a first interval between a start time when power is applied to the motor and a dead time, a second interval between the dead time and a switch time, and a third interval between the switch time and an end time when the motor enters closed-loop operation, wherein the startup interval ends at a time based on the observer error, and wherein the startup q-axis voltage increases during the first time interval and decreases during the second time interval and the third time interval. The start time can correspond to a first startup q-axis voltage and the dead time can correspond to a second startup q-axis voltage that is greater than the first startup q-axis voltage. The first startup q-axis voltage and the second startup q-axis voltage can be user programmable. The dead time can correspond to dead frequency and the dead frequency can be user programmable. The switch time can correspond to a switch frequency and the switch frequency can be user programmable. The controller can be a Field Oriented Control (FOC) controller. Each of the d-axis control loop and the q-axis control loop of the controller can include a Proportional-Integral (PI) unit. The demand signal can include a user provided speed demand signal indictive of a desired motor speed.

According to the disclosure, a method of controlling startup of a motor having a plurality of windings includes applying a controlled voltage to the plurality of windings, measuring a current through the one or more of the plurality of windings, and generating with a Field Oriented Control (FOC) controller that comprises a d-axis control loop configured to generate an applied d-axis voltage and a q-axis control loop configured to generate an applied q-axis voltage, a PWM signal for coupling to a gate driver that is configured to apply the controlled voltage to the plurality of windings. During a startup interval, the applied q-axis voltage includes a startup q-axis voltage generated by applying a first applied q-axis voltage, incrementing a frequency, incrementing the applied q-axis voltage until the frequency is greater than a dead frequency, wherein the dead frequency corresponds to the applied q-axis voltage being equal to a second applied q-axis voltage that is greater than the first startup q-axis voltage, decrementing the startup q-axis voltage once the frequency is greater than the dead frequency and until the frequency reaches a switch frequency, determining if an observer error is greater than a threshold when the frequency reaches the switch frequency, wherein the observer error is representative of a difference between an angle estimate and an actual angle, and commencing closed-loop motor control once the observer error is less than the threshold for a predetermined interval.

Features of the disclosure may include one or more of the following, alone or in combination. Generating the PWM signal can include generating the PWM signal to continuously linearly increase a speed of the motor during the startup interval. Incrementing the startup q-axis voltage can include incrementing the startup q-axis voltage by an increment that is adjustable based on the observer error. The increment can be equal to a constant value plus the observer error.

According to a further aspect of the disclosure, a motor controller includes an observer configured to generate a speed estimate, an angle estimate, and an observer error representative of a difference between an actual angle and the angle estimate and a startup module configured to generate a startup d-axis voltage during a startup interval and a startup q-axis voltage during the startup interval, wherein the startup interval ends at a time based on the observer error, and wherein the startup q-axis voltage increases during the startup interval.

Features of the disclosure may include one or more of the following, alone or in combination. The startup module may be further configured to continuously linearly increase the speed of the motor during the startup interval. A voltage increment by which the startup q-axis voltage is increased during the startup interval can be adjusted based on the observer error. The voltage increment can be equal to a constant value plus the observer error.

BRIEF DESCRIPTION OF THE DRAWINGS

The foregoing features of the disclosure, as well as the disclosure itself may be more fully understood from the following detailed description of the drawings. The drawings aid in explaining and understanding the disclosed technology. Since it is often impractical or impossible to illustrate and describe every possible embodiment, the provided figures depict one or more exemplary embodiments. Accordingly, the figures are not intended to limit the scope of the invention. Like numbers in the figures denote like elements.

DETAILED DESCRIPTION

Figure 1:
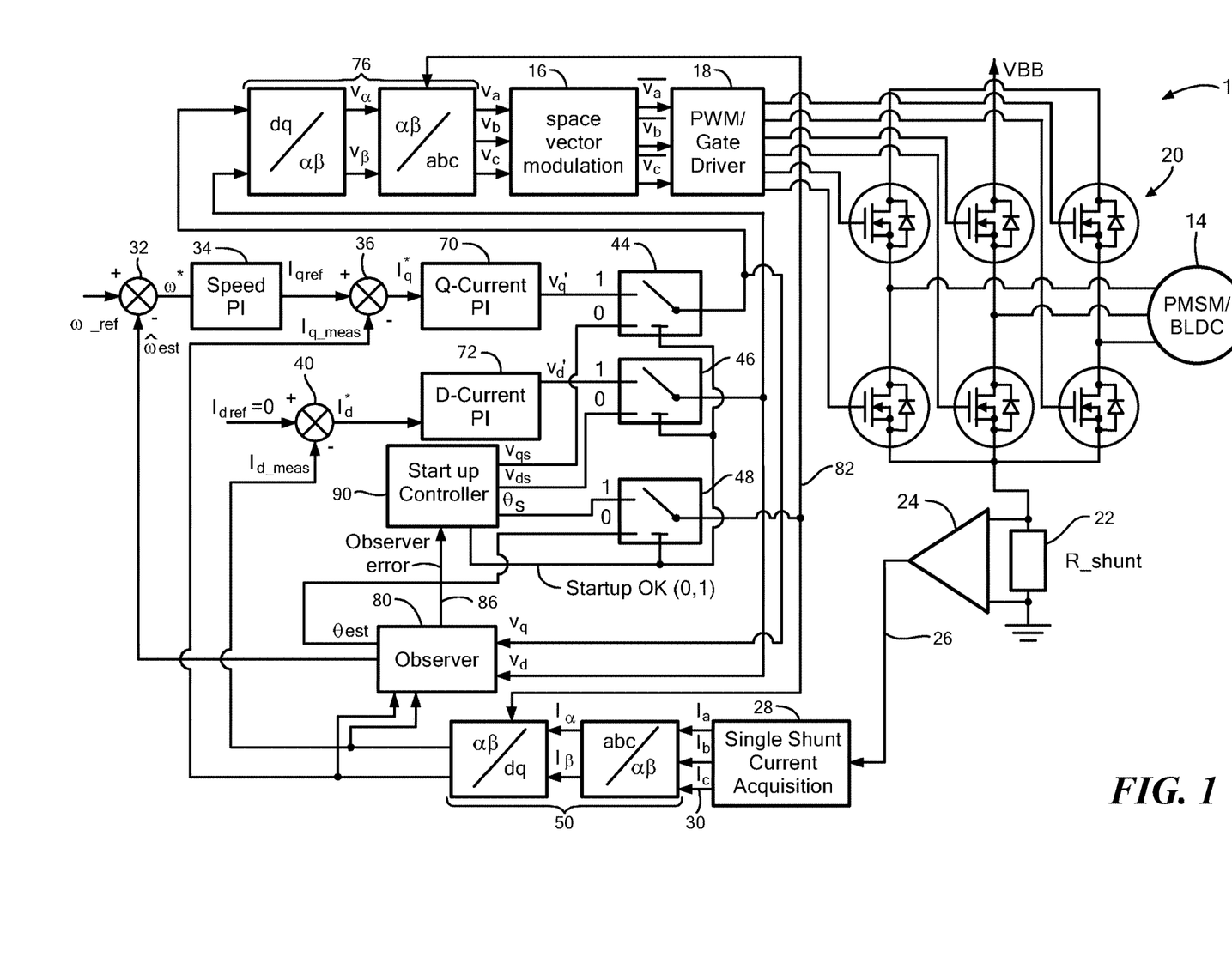
FIG. 1 is a schematic representation of a motor control system including startup control to reduce acoustic noise in accordance with the disclosure.

Referring to FIG. 1, a motor control system 10 for controlling operation of a motor 14 having a plurality of windings includes a Space Vector Pulse Width Modulation (SVPWM) block 16 and a PWM/gate driver 18 to provide control signals (i.e., PWM signals) to switches 20 to control the motor winding voltages in order to achieve a desired speed corresponding to a speed demand signal $\omega\_ref$.

Speed demand signal $\omega\_ref$ can be user provided and, in general, is indicative of a requested speed of motor 14. Speed demand signal $\omega\_ref$ can be provided in a variety of formats, for example, a Single Edge Nibble Transmission (SENT) format, a Serial Peripheral Interface (SPI) format, a Local Interconnect Network (LIN) format, a CAN (Controller Area Network) format, an Inter-Integrated Circuit ($I^2C$) format, or other signal formats. Speed demand signal $\omega\_ref$ can be a voltage signal having a selected voltage value indicative of a desired speed of motor 14. Speed demand signal $\omega\_ref$ may also be a pulse width modulated (PWM) signal having a selected duty cycle that represents the desired speed of motor 14. In embodiments in which speed demand signal $\omega\_ref$ is a PWM signal, the duty cycle of the PWM control signals may be proportional to the duty cycle of speed demand signal. Further, speed demand signal $\omega\_ref$ can be a digital signal having a digital value representative of the desired speed of motor 14.

Current through the motor windings can be measured by current sensing circuitry as may be implemented with various circuitry. For example, one or more sense resistors 22 can measure the current through one more motor windings for processing by comparator 24 to generate a signal 26 indicative of the winding current. Winding currents can be individually measured and need not include measurement of all three phase currents since the sum of the three phase currents equals zero. To this end, a current acquisition block 28 can process current measured in two of the three motor windings and the third current can be calculated as the negative sum of two measured winding currents. The measured winding currents Ia, Ib, Ic are collectively labeled 30.

The motor control circuitry operates on an FOC principle and includes a d-axis control loop configured to generate an applied d-axis voltage Vd and a q-axis control loop configured to generate an applied q-axis voltage Vq.

A converter 50 is configured to generate a d-axis feedback current Id_meas and a q-axis feedback current Iq_meas. Converter 50 can implement Clarke transformation or other processing in order to convert the motor winding current 30 into two-dimensional orthogonal stationary quantities $i_\alpha$, $i_\beta$ and can also apply a Park transformation to convert the two-axis stationary system $i_\alpha$, $i_\beta$ into a two-axis rotating system, where the d-axis current is aligned with the rotor flux and the q-axis current (the torque-producing component) is orthogonal to the rotor flux. An observed motor position signal 82 (generated as described below) is used by the converter 50 for the transformation from the three-phase motor winding current 30 into the two-dimensional quantities.

A converter 76 is coupled to receive the applied d-axis voltage Vd, the applied q-axis voltage Vq, and the observed motor position signal 82 and is configured to convert the voltage signals from the d, q domain into three-phase motor control signals Va, Vb, Vc for coupling to the SVPWM block 16. For example, converter 76 can implement an inverse Clarke and Park transform to convert the two-axis rotating signals Vq, Vd into a stationary two-axis system and ultimately into three axis signals Va, Vb, Vc. With this arrangement, the applied d-axis voltage Vd and the applied q-axis voltage Vq are rotated back into the stationary reference frame using the transformation angle to obtain quadrature voltage values, Vα and Vβ. Voltages Vα and Vβ are then mathematically transformed back into three phase-voltages Va, Vb, and Vc, which determine the new PWM duty-cycle. The observed motor position signal 82 is used by the converter 76 for the transformation from the two-dimensional quantities Vα and Vβ into the three-phase voltages Va, Vb, and Vc.

Observer 80 is responsive to the applied d-axis voltage Vd and the applied q-axis voltage Vq, the d-axis feedback current Id_meas, and the q-axis feedback current Iq_meas. Observer 80 is configured to generate a speed estimate, or observed speed signal $\omega_{est}$, an angle, or position estimate $\theta_{est}$, and an observer error 86 representative of a difference between an actual angle and the angle estimate $\theta_{est}$. The actual, or real angle can be obtained by integration of the applied frequency and angle error can be obtained directly. The error between real (motor) angle and estimated angle is estimated from the error between real signal (e.g. d-axis voltage (applied voltage)) and the estimated signal from the observer (e.g. d-axis voltage (observer)). By correcting this error to 0, angle error will be also 0. Observer 80 may include neural network based "on-line" learning, a model reference adaptive system (MRAS), Kalman filters, an adaptive non-linear flux observer, and/or a sliding mode observer. The observed speed signal $\omega_{est}$ can be used by da speed controller 34 to generate the q-axis reference current signal Iqref.

During the motor startup interval, position signal 82 is provided by a startup angle estimate signal θs and thereafter, during closed-loop motor operation, the position signal 82 is provided by the observer angle estimate signal $\theta_{est}$.

The d-axis control loop can include a summation element 40 and a Proportional-Integral (PI) control unit 72 in order to generate d-axis voltage Vd'. The d-axis feedback current Id_meas can be coupled to summation element 40 with which a d-axis reference current signal Idref is summed with the feedback current (i.e., a difference is determined). An output of the summation element 40 provides a signal Id* for coupling to the PI control unit 72. PI control unit 72 is configured to apply proportional integral control in order to generate d-axis voltage Vd'. In applications, the d-axis reference current signal Idref can be set to zero. When the d-axis reference current signal Idref is zero, the signal Id* is equal to the d-axis feedback current Id_meas and the d-axis voltage Vd' is a proportional integral representation of the d-axis feedback current Id_meas.

The q-axis control loop can include a summation element 36 and PI control unit 70 in order to generate the q-axis voltage signal Vq'. The q-axis feedback current Iq_meas that controls motor torque output can be coupled to summation element 36 with which a q-axis reference current signal Iqref is summed with the q-axis feedback current Iq_meas (i.e., a difference is determined) in order to generate a signal Iq* for coupling to the PI control unit 70. The q-axis reference current signal Iqref can be generated by taking a difference (e.g., with a summation element 32) between the speed demand signal ω_ref and an observed speed signal $\omega_{est}$. PI control unit 70 is configured to apply proportional integral control in order to generate q-axis voltage Vq'.

A startup control module 90 is configured to generate a startup d-axis voltage Vds that provides the applied d-axis voltage during a startup interval and a startup q-axis voltage Vqs that provides the applied q-axis voltage during the startup interval. The controller 90 is also responsive to the observer error 86 to generate the startup angle signal θs.

To this end, during the startup interval, a switch 44 selectively couples the startup q-axis voltage Vqs to provide the applied q-axis voltage Vq to the converter 76 and to the observer 80. During closed-loop operation, switch 44 selectively couples the q-axis voltage Vq' as provided by the PI controller 70 as the applied q-axis voltage Vq to the converter 76 and to the observer 80. A Startup OK signal as provided by the startup controller 90 determines the state of switch 44.

Similarly, during the startup interval, a switch 46 selectively couples the startup d-axis voltage Vds to provide the applied d-axis voltage Vd to the converter 76 and to the observer 80. During closed-loop operation, switch 46 selectively couples the d-axis voltage Vd' as provided by the PI controller 72 as the applied d-axis voltage Vd to the converter 76 and to the observer 80. The Startup OK signal as provided by the startup controller 90 determines the state of switch 46.

Further, during the startup interval, a switch 48 selectively couples the startup angle signal θs as the observed motor position signal 82. During closed-loop operation, switch 48 selectively couples the angle estimate $\theta_{est}$ as the observed motor position signal 82. The Startup OK signal as provided by the startup controller 90 determines the state of switch 48.

Figure 2:
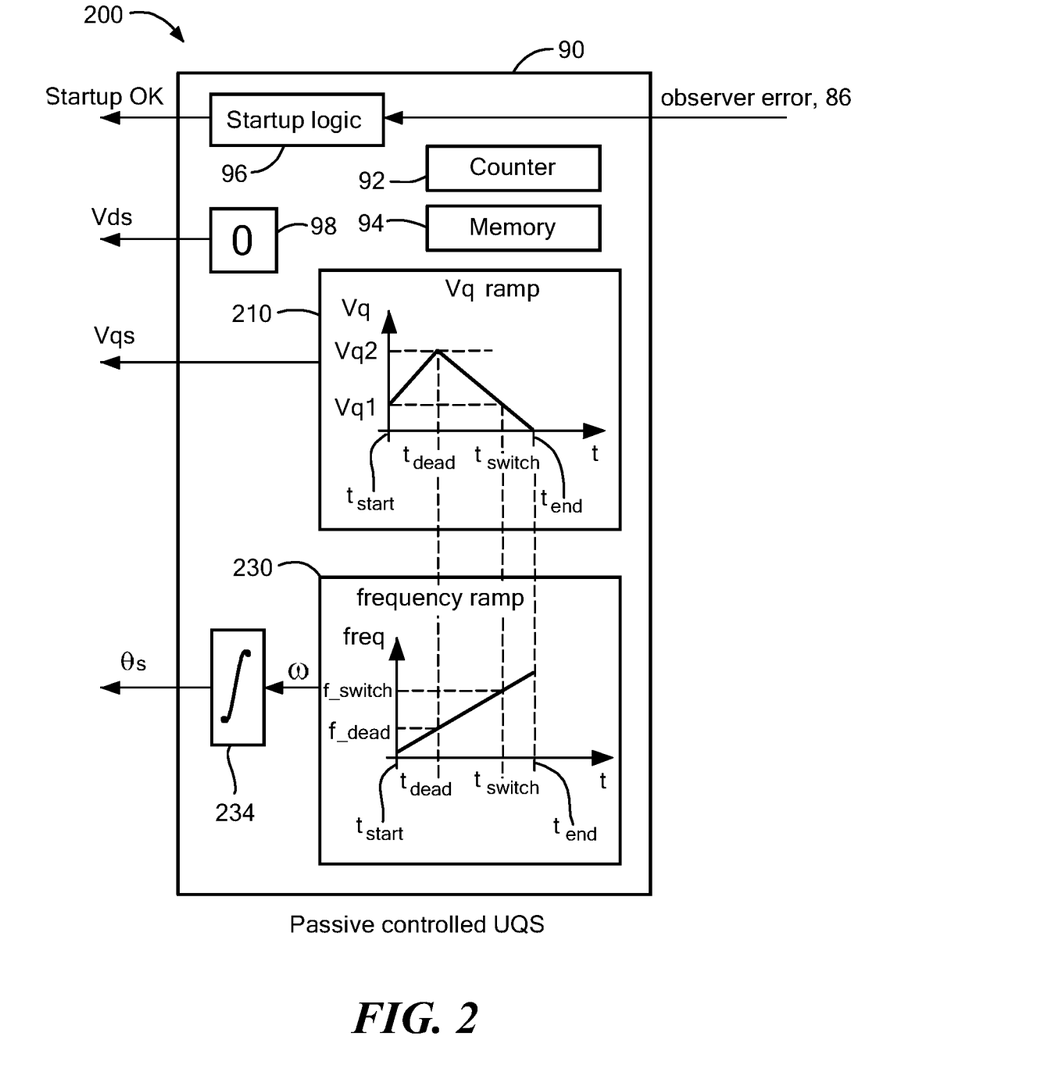
FIG. 2 is a block diagram of the startup controller of FIG. 1 illustrating aspects of a passive startup control mode.
Figure 3:
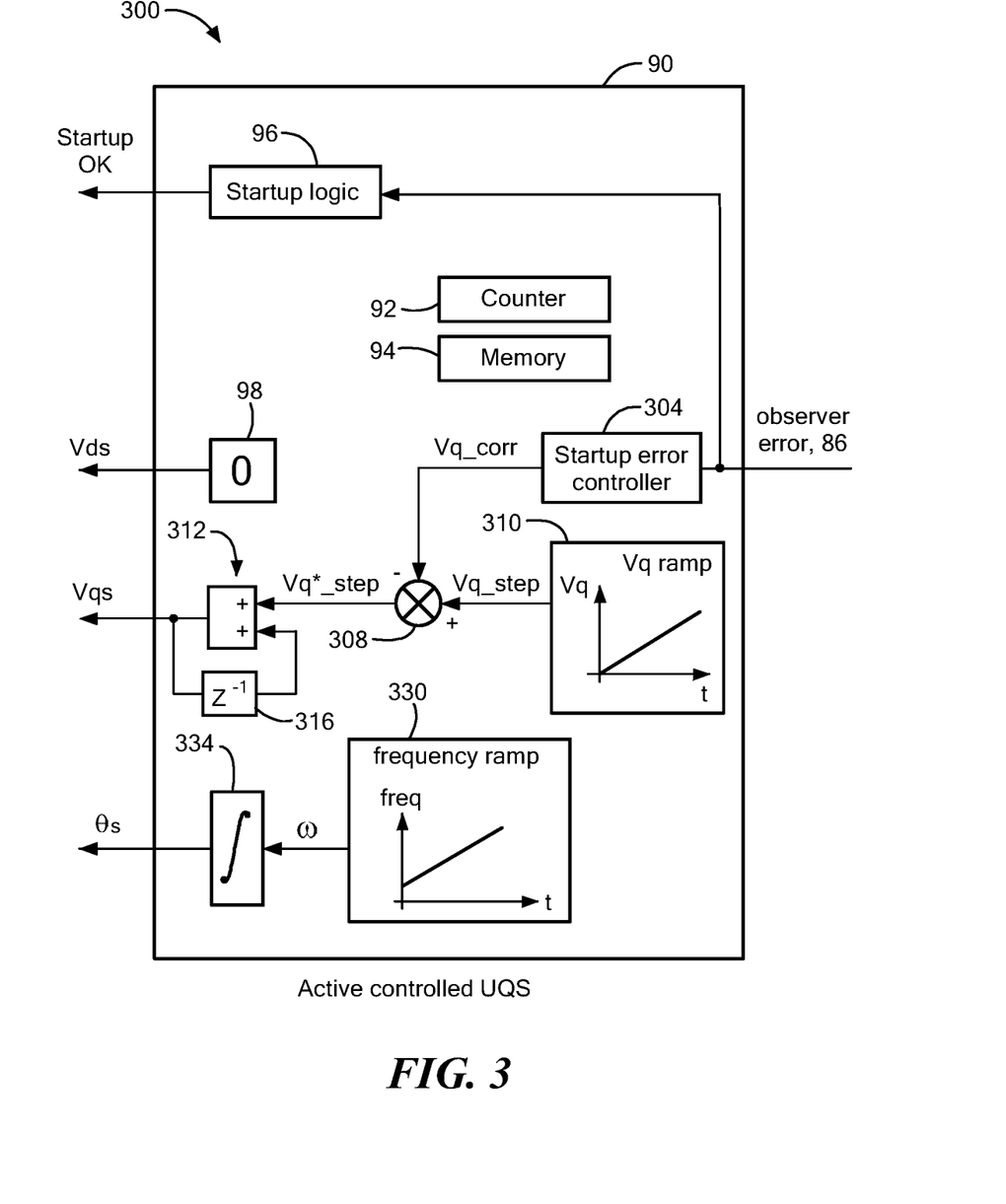
FIG. 3 is a block diagram of the startup controller of FIG. 1 illustrating aspects of an active startup control mode.
Figure 4:
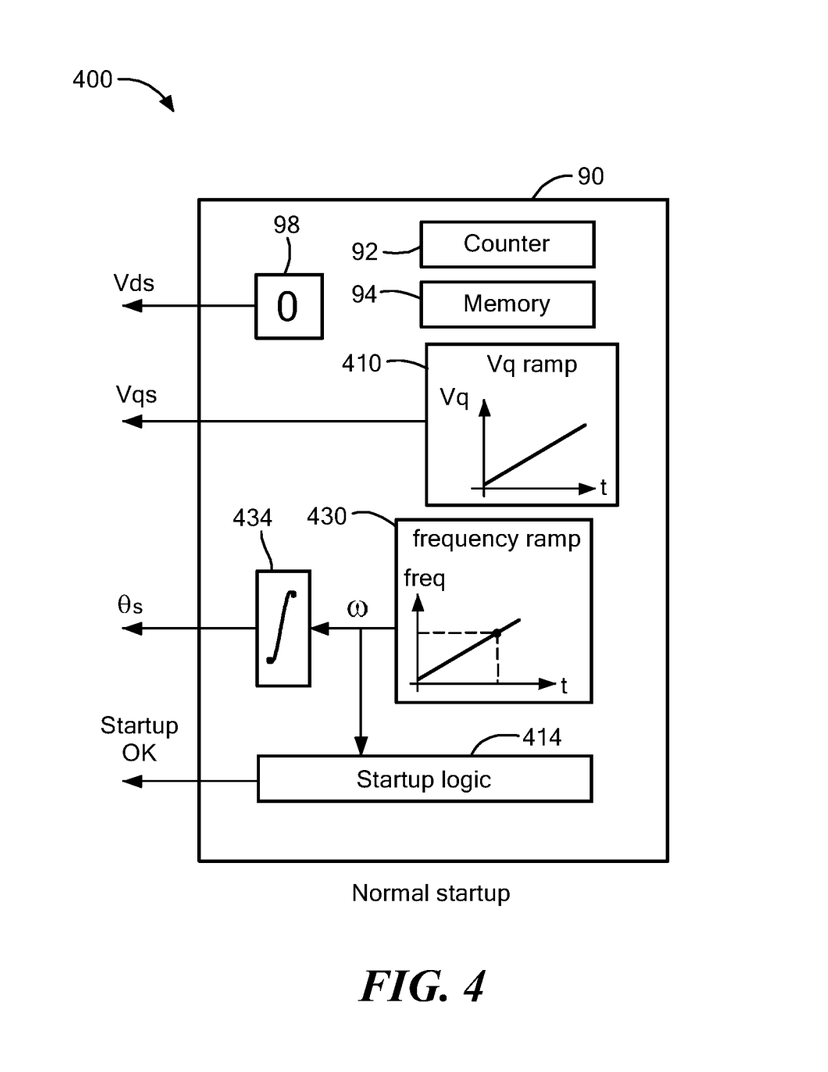
FIG. 4 is a block diagram of the startup controller of FIG. 1 illustrating aspects of normal startup control mode.

As will be described, startup controller 90 is configured to operate in a user-selected one of three modes; namely, a passive ultra quite startup (UQS) mode, an active UQS mode, and a normal startup mode. Block diagrams associated with the startup modes are illustrated in FIGS. 2, 3, and 4 and processing steps associated with each of the startup modes are illustrated in the flow diagram of FIG. 5. In general, startup controller 90 is responsive to observer error signal 86 and generates the Startup OK signal, the startup d-axis voltage Vds, the startup q-axis voltage Vqs, and the startup angle signal θs.

The Startup OK signal is generated by startup logic within the controller 90 and sets the state of switches 44, 46, 48 based on whether the motor is in an open-loop startup interval or in closed-loop FOC control. For both the passive startup mode and the active startup mode, the duration of the startup interval is based on the observer error 86. For the normal startup mode, the duration of the startup interval is based on the motor speed.

According to the disclosure, during both the passive startup mode and the active startup mode, the startup q-axis voltage Vqs increases during a portion of the startup interval. In particular, in both passive UQS and active UQS, the startup q-axis voltage Vqs is increased. As will become apparent, in the passive UQS, the q-axis voltage is increased from a first user-programmable level Vq1 to a second user-programmable level Vq2 that is greater than the first level Vq1. During active UQS, the q-axis voltage is increased by an adjustable increment that is adjusted based on the observer error 86. Startup operation in the described fashions advantageously results in optimal transition from startup control to closed-loop operation in terms of minimizing acoustic noise without increasing the startup interval duration.

Advantageously the motor speed is continuously linearly increased during the startup interval. With this arrangement, optimal transitioning from open-loop startup control to closed-loop operation is achieved without lengthening the startup interval.

For use in connection with the various startup modes of operation, a user can set (e.g., via a programming interface) certain parameters including a starting frequency f_start, an ending frequency fend, and a dead frequency f_dead. The dead frequency f_dead is the frequency at which the startup q-axis voltage Vqs reaches the Vq2 voltage level, following which voltage Vqs is decreased. A switch frequency f_switch can also be a user set value and corresponds to the frequency at and above which the observer error 86 is evaluated for optimal transition timing to closed-loop operation and thus, f_switch is the lowest frequency at which the controller operation could possibly transition to closed-loop. The user additionally sets a number of PWM periods or cycles during the startup interval. From the f_start frequency and the f_end frequency and the number of PWM periods, a frequency step size is determined. Also, an end time t_end of the open-loop startup interval is determined. It will be appreciated by those of ordinary skill in the art that any values described herein as being user provided or programmable can be preset or predetermined.

Referring to FIG. 2, a block diagram 200 illustrates aspects of the startup controller 90 associated with passive startup control. Memory 94 can store preset and/or user-programmable values and can take the form of EEPROM or other suitable memory.

Controller 90 includes startup logic 96 with which the Startup OK signal is generated in response to the observer error 86. As explained below in connection with FIG. 5, with passive control, the startup interval continues until the frequency is at f_switch and the observer error 86 is less than a predetermined threshold for a predetermined duration corresponding to a count threshold being met. To this end, counter 92 is provided. Stated differently, the Startup OK signal is at a first logic level corresponding to operation in the startup interval until the frequency is at f_switch and the observer error 86 is less than a predetermined threshold for a predetermined duration, following which the Startup OK signal transitions to a second logic level to end the startup interval and transition to closed-loop motor control.

When the Startup OK signal level corresponds to the startup interval, the d-axis voltage Vds is set to zero as indicated at element 98.

According to an aspect of the disclosure, during the startup interval in the passive control mode, the startup q-axis voltage Vqs is initially ramped up from Vq1 to Vq2 and is thereafter ramped down as illustrated at block 210. Process steps by which the startup q-axis voltage Vqs is generated during passive control are described in connection with FIG. 5.

During the startup interval, the frequency is ramped up linearly from a starting frequency at a starting time tstart=0 seconds to a frequency that corresponds to the user set end time $t_{end}$ as illustrated by block 230. The frequency ramp establishes the motor speed ω which, upon integration at block 234, results in the startup angle estimate signal θs. As noted above, during startup, the startup angle estimate signal θs is used by the converters 50, 76.

Referring to FIG. 3, a block diagram 300 illustrates aspects of the startup controller 90 associated with active startup control. As noted above, startup logic 96 generates the Startup OK signal in response to the observer error 86 at a first logic level to denote operation in the startup interval until the frequency is at f_switch and the observer error 86 is less than a predetermined threshold for a predetermined duration corresponding to a count threshold being met by counter 92 or at a second logic level to denote closed-loop operation following startup. During startup, the d-axis voltage Vds is set to zero as indicated at element 98.

According to an aspect of the disclosure, during the startup interval in the active control mode, the startup q-axis voltage Vqs is adjusted by an adjustable increment that is adjusted based on the observer error 86. Process steps by which the startup q-axis voltage Vqs is generated during active control are described in connection with FIG. 5.

Suffice it to say here that a correction value Vq_corr is determined by the controller 90 based on the observer error 86 as represented by block 304, as may be accomplished by proportional or proportional integral control, as non-limiting examples. Thus, as an example using proportional control, the correction value, or increment Vq_corr is equal to a constant value plus the observer error 86.

A summation element 308 sums the current q-axis voltage Vq_step as illustrated at block 310 with the correction value Vq_corr to generate a Vq*_step value. Blocks 312, 316 represent integration of the corrected q-axis voltage Vq*_step to generate the startup q-axis voltage Vqs. More particularly, the startup q-axis voltage Vqs can be represented as follows, where k is the PWM period:

$$Vqs(k)=Vq(k-1)+Vq^*\_step=Vq(k-1)+(Vq\_step-Vq\_corr(k))$$

During the startup interval, the frequency is ramped up linearly from zero to a frequency that corresponds to the user set end time $t_{end}$ as illustrated by block 330. The frequency ramp establishes the motor speed ω which, upon integration at block 334, results in the startup angle estimate signal θs. As noted above, during startup, the startup angle estimate signal θs is used by the converters 50, 76.

Referring to FIG. 4, a block diagram 400 illustrates aspects of the startup controller 90 associated with normal startup control. Controller 90 includes startup logic 414 with which the Startup OK signal is generated during normal startup operation. In normal startup mode, the startup interval lasts until a predetermined speed ω is achieved (e.g., as opposed to being based on the observer error as is the case with passive and active startup control). In other words, the Startup OK signal is at a first logic level indicating normal startup control when the speed ω is less than a predetermined level and is at a second logic level indicating closed-loop control once the speed ω reaches the predetermined level.

When the Startup OK signal level corresponds to the startup interval, the d-axis voltage Vds is set to zero as indicated at element 98.

During normal startup control, the startup q-axis voltage Vqs is linearly ramped up as illustrated at block 410. Process steps by which the startup q-axis voltage Vqs is generated during normal control are described in connection with FIG. 5.

During the startup interval, the frequency is ramped up linearly from zero to a frequency that corresponds to the user set end time $t_{end}$ as illustrated by block 430. The frequency ramp establishes the motor speed ω which, upon integration at block 434, results in the startup angle estimate signal θs. As noted above, during startup, the startup angle estimate signal θs is used by the converters 50, 76. The q-axis voltage and the frequency ramp can be incremented with every step of counter 92.

Figure 5:
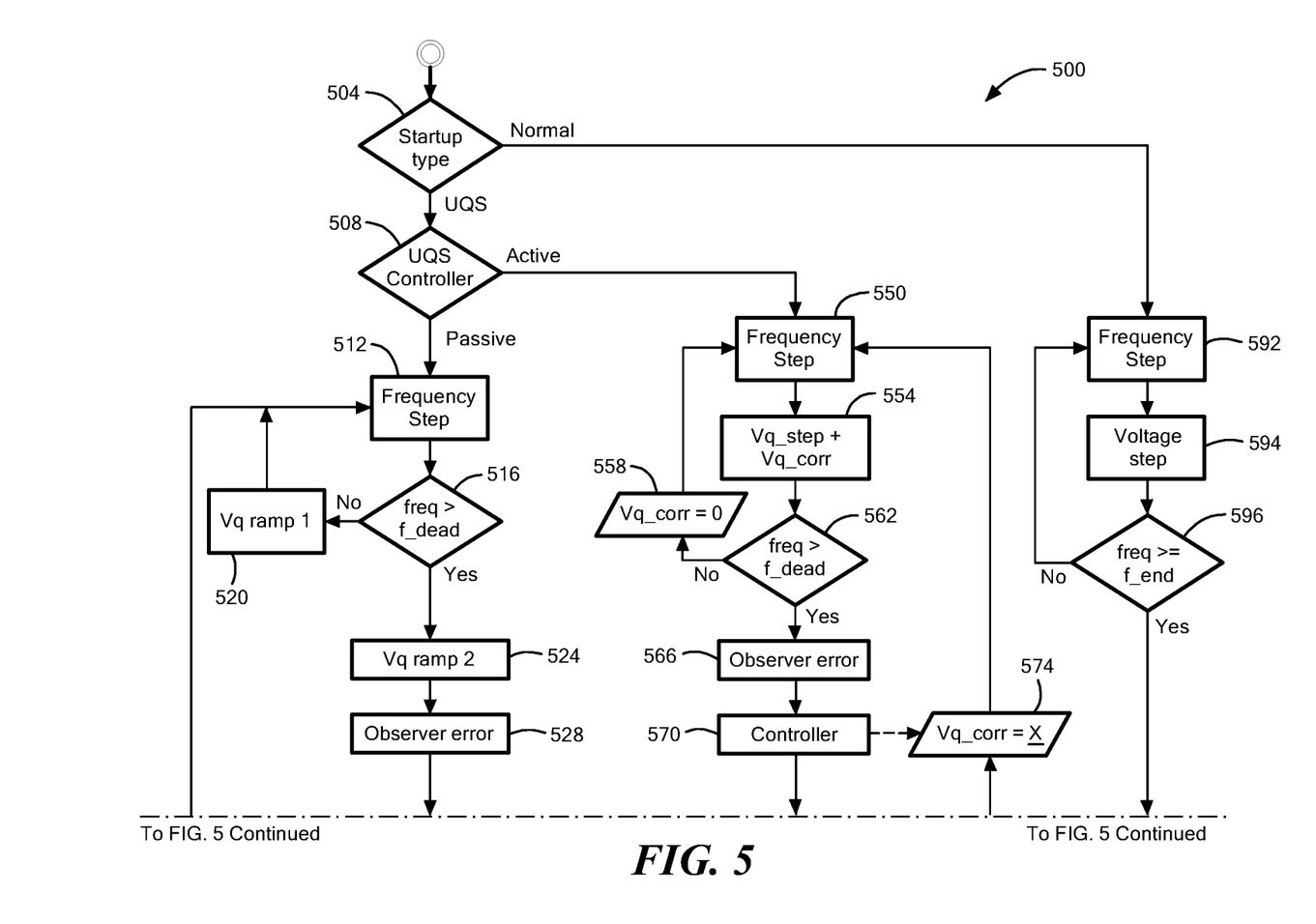
FIG. 5 is a flow diagram illustrating motor startup with passive, active, and normal modes in accordance with the disclosure.

Referring to FIG. 5, a flow diagram 500 illustrates motor control during startup to reduce acoustic noise. In step 504, the type of startup control is determined from between a normal startup or an ultra quiet startup (UQS).

If UQS is selected, then at block 508, it is determined whether active or passive UQS startup is selected. A user selects between active control versus passive control based on the motor type. For example, for motors with a relatively high moment of inertia, passive startup control can be selected; whereas, for motors with a lower moment of inertia, low inductance motors, active startup control can be selected.

If passive UQS startup is selected, then at block 512, a frequency step size is set. As noted above, the user selects the start frequency f_start, the dead frequency f_dead, the switch frequency f_switch, and the end frequency f_end. From these programmed values and also from a programmed value for the number of PWM periods during the startup interval, a frequency step size, or increment is determined. For example, where f_start is 1 Hz and f_end is 1 KHz and the number of PWM periods at 10,000, each frequency step is 0.1 Hz. In this example, the first time that block 512 occurs, the frequency is set at 1 Hz (i.e., f_start) and each time block 512 occurs thereafter, the frequency is incremented by 0.1 Hz.

At block 516, it is determined whether the frequency is greater than f_dead. If the frequency is not greater than f_dead, then the first time block 516 is performed, the startup q-axis voltage Vqs is set to the programmed level of Vq1 at block 520. In subsequent occurrences of block 516 for which the frequency is not greater than f_dead, the startup q-axis voltage Vqs is incremented based on a slope established by the programmed levels of Vq1 and Vq2. Following block 520, the frequency is incremented at block 512, as shown.

If the frequency is greater than f_dead at block 516, then the q-axis voltage Vqs is at the programmed level of Vq2 and at block 524, the startup q-axis voltage Vqs is decremented. In particular, the startup q-axis voltage Vqs can be decremented by a fixed voltage step given by the following where the number of steps can be equal to t_end−t_dead)/PWMperiod:

$$\text{Voltage Step} = \frac{v_{q2} \ll 16}{\text{Number of Steps}} \gg p_3$$

At block 528, the observer error 86 is calculated by the observer 80.

At block 532, it is determined whether the frequency is greater than f_switch. If the frequency is not greater than f_switch, then the frequency is incremented by the determined step size at block 512. If the frequency is greater than f_switch, then at block 536, it is determined whether the observer error is less than a predetermined threshold.

If the observer error is not less than the predetermined threshold, then the frequency is incremented by the determined step size at block 512. If the observer error is less than the predetermined threshold, then a counter (e.g., counter 92) is incremented at block 540, following which it is determined at block 544 whether the counter is equal to or greater than a predetermined count threshold. If at block 544 it is determined that the counter is less than the predetermined count threshold, then the frequency is again incremented at block 512 and open-loop startup operation continues.

If it is determined that the counter is greater than or equal to the predetermined count threshold (i.e., that the observer error 86 is under a predetermined threshold for a predetermined interval), then at block 598, the startup interval terminates and motor control system 10 transitions to closed-loop FOC operation. The user may program the predetermined observer error threshold and the count value that corresponds to a transition from startup to closed-loop operation. Alternatively, such values can be preset.

If active UQS startup is selected at block 508, then at block 550, a frequency step is set as explained above in connection with block 512. At block 554, the startup q-axis voltage Vqs is incremented by correction value Vq_corr. In other words, at each PWM period k, the updated startup q-axis voltage Vqs is given by:

$$Vqs(k) = Vq(k-1) + Vq^*\_step = Vq(k-1) + (Vq\_step - Vq\_corr(k))$$

At block 562, it is determined whether the frequency is greater than f_dead. If the frequency is not greater than f_dead, then the correction factor Vq_corr is set to zero at block 558 and the frequency is incremented at block 550, as shown. In other words, until the frequency reaches f_dead, no correction is applied to the Vq voltage. If the frequency is greater than f_dead, then at block 566, the observer error is evaluated.

At block 570, controller 90 receives the calculated observer error and at block 574 establishes the correction factor Vq_corr based on the calculated observer error. For example, the correction factor Vq_corr can be set to a value X determined by various control methodologies. For example, the Vq_corr value can be based on a proportional controller by which the observer error is multiplied by a constant, as an example. Other control methodologies including, but not limited to proportional integral (PI) control or proportional integral derivative (PID) control can be used.

At block 578, it is determined whether the frequency is greater than f_switch. If the frequency is not greater than f_switch, then the frequency is incremented by the determined step size at block 550. If the frequency is greater than f_switch, then at block 582, it is determined whether the observer error is less than a predetermined threshold.

If the observer error is not less than the predetermined threshold, then the frequency is incremented by the determined step size at block 550. If the observer error is less than the predetermined threshold, then a counter (e.g., counter 92) is incremented at block 586, following which it is determined at block 590 whether the counter is equal to or greater than a predetermined count threshold.

If at block 590 it is determined that the counter is less than the predetermined count threshold, then the frequency is again incremented at block 550 and open-loop startup operation continues.

If it is determined that the counter is greater than or equal to the predetermined count threshold (i.e., that the observer error 86 is under a predetermined threshold for a predetermined interval), then at block 598, the startup interval terminates and motor control system 10 transitions to closed-loop FOC operation.

In embodiments, the frequency step, observer error threshold, and counter threshold value can be the same in both passive UQS control as it is in active UQS control. In other words, blocks 512, 536, and 544 can be the same as blocks 550, 582, and 590. Alternatively, such parameters can be different for the different types of startup control.

If normal start up is selected at block 504, then at block 592, a frequency step is set, for example as explained above in connection with block 512.

At block 594, a voltage step is set. An initial voltage level and a final voltage level can be preset or user selected. Given the user programmed PWM periods for the startup interval, a voltage step can thus be calculated.

At block 596, it is determined whether the frequency is greater than f_end. If the frequency is not greater than f_end, then the frequency is incremented at block 592, as shown. Alternatively, if the frequency is at or greater than f_end, then at block 598, the startup interval terminates and motor control system 10 transitions to closed-loop operation.

Figure 6:
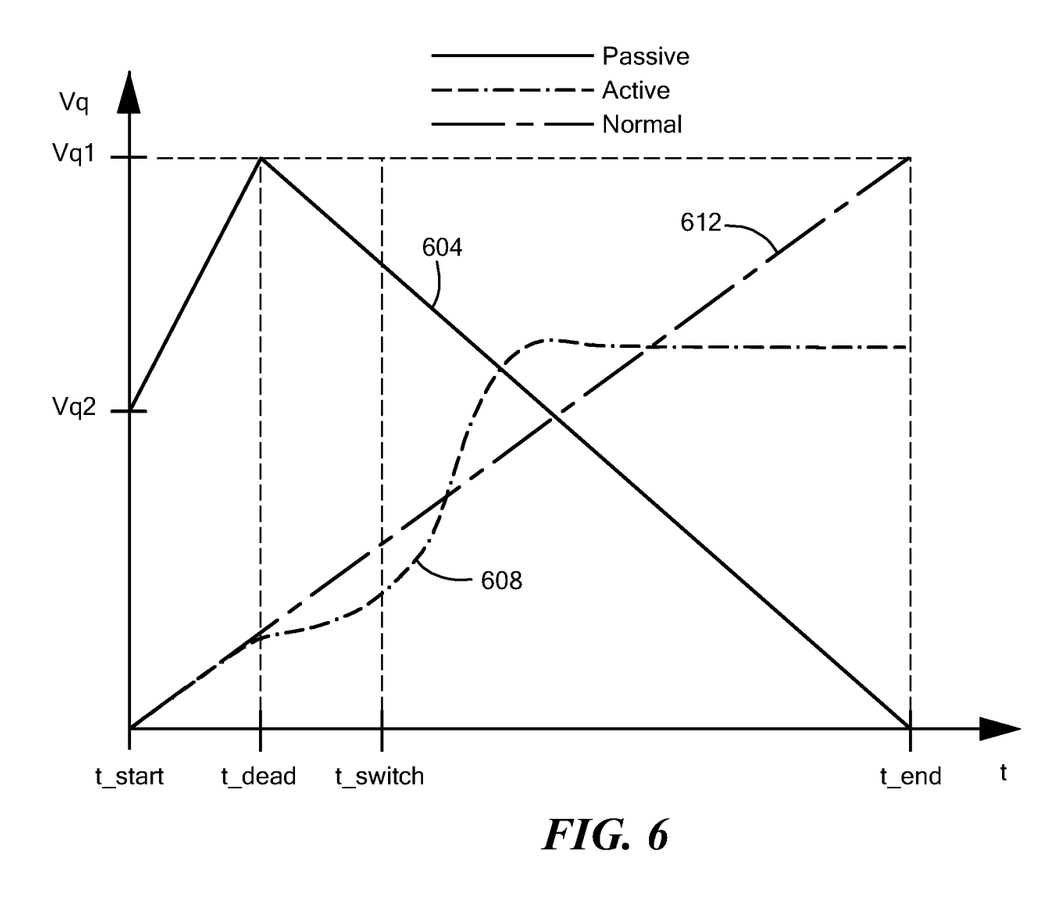
FIG. 6 illustrates the applied q-axis voltage over frequency for a passive startup control mode, an active startup control mode, and a normal startup control mode.

FIG. 6 illustrates the applied q-axis voltage Vq over frequency for a passive startup control mode, an active startup control mode, and a normal startup control mode. The applied q-axis voltage (which is the same as the startup q-axis voltage Vqs during the startup interval) is shown along the vertical axis in arbitrary units of voltage and frequency is shown along the horizontal axis in arbitrary units of Hertz.

During passive startup control, the q-axis voltage 604 increases from t_start to t_dead and then decreases from t_dead to t_end as shown and as described above. During active startup control, once the frequency reaches t_dead, the applied q-axis voltage 608 is adjusted by the adjustable increment Vq*_step that is based on a Vq_corr value that is determined by the startup error controller 304 based on the observer error as described above. During normal startup control, the applied q-axis voltage 612 increases linearly from t_start to t_end.

Figure 7:
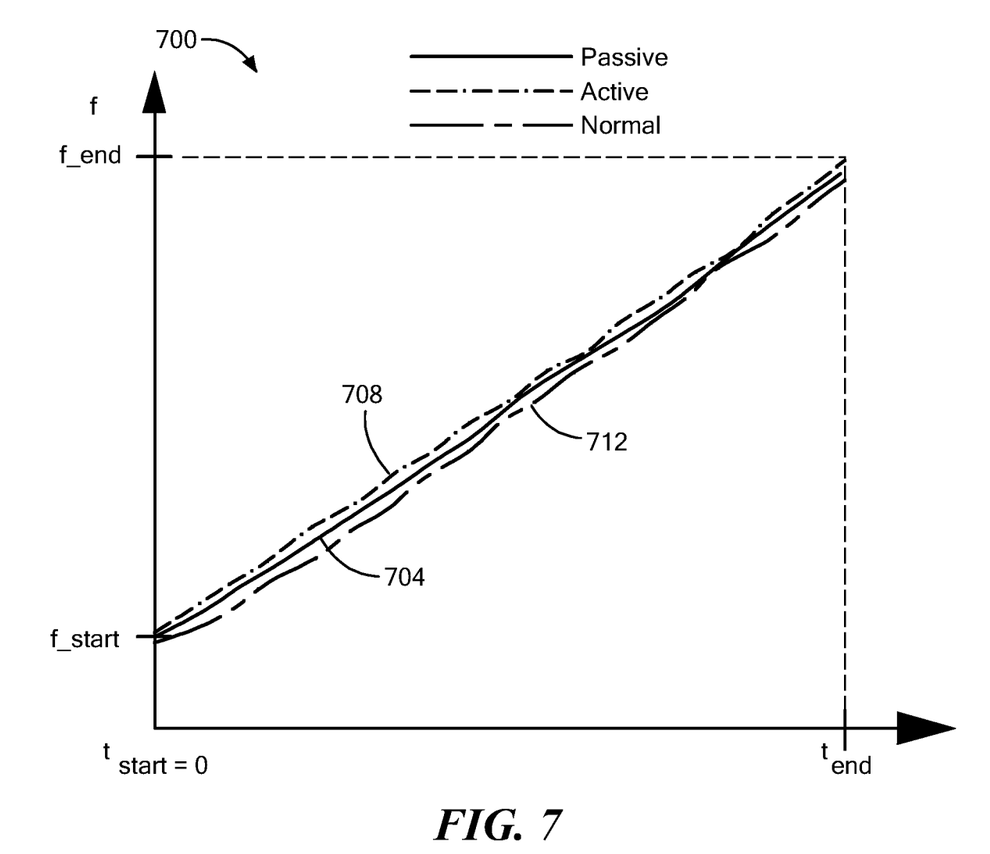
FIG. 7 illustrates motor frequency over time for a passive startup control mode, an active startup control mode, and a normal startup control mode.

FIG. 7 illustrates motor frequency over time for a passive startup control mode, an active startup control mode, and a normal startup control mode. Frequency is shown along the vertical axis in arbitrary units of Hertz and time is shown along the horizontal axis in arbitrary units of time such as milliseconds.

In each of the three types of startup modes, the frequency increases substantially linearly from t_start to t_end, which corresponds to motor frequencies of f_start to f_end, as shown.

Figure 8:
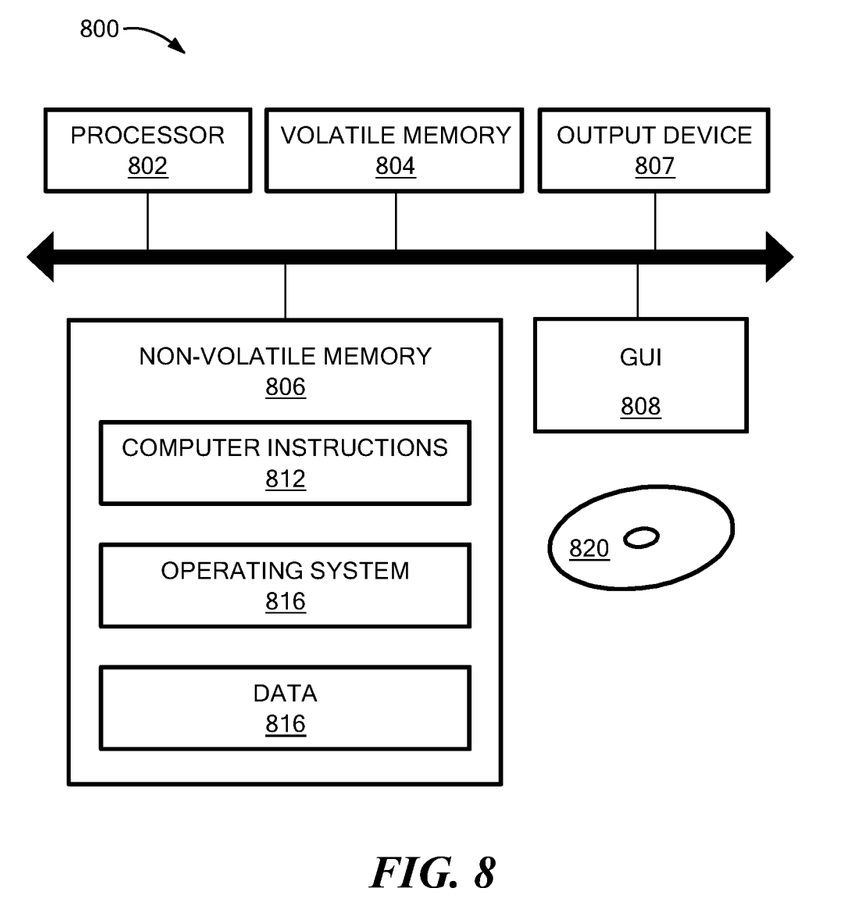
FIG. 8 is a schematic representation of an example computer that can perform at least a portion of the processing described herein.

Referring to FIG. 8, shows an exemplary computer 800 that can perform at least part of the processing described herein, such as controlling motor startup as described above. The computer 800 includes a processor 802, a volatile memory 804, a non-volatile memory 806 (e.g., hard disk), an output device 807 and a graphical user interface (GUI) 808 (e.g., a mouse, a keyboard, a display, for example). The non-volatile memory 806 stores computer instructions 812, an operating system 816 and data 818. In one example, the computer instructions 812 are executed by the processor 802 out of volatile memory 804. In one embodiment, an article 820 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)). As used herein, circuitry refers to any implementation of hardware, firmware, and/or software that includes at least one transistor, i.e., is not per se software.

As used herein, the terms "processor" and "controller" are used to describe electronic circuitry that performs a function, an operation, or a sequence of operations. The function, operation, or sequence of operations can be hard coded into the electronic circuit or soft coded by way of instructions held in a memory device. The function, operation, or sequence of operations can be performed using digital values or using analog signals. In some embodiments, the processor or controller can be embodied in an application specific integrated circuit (ASIC), which can be an analog ASIC or a digital ASIC, in a microprocessor with associated program memory and/or in a discrete electronic circuit, which can be analog or digital. A processor or controller can contain internal processors or modules that perform portions of the function, operation, or sequence of operations. Similarly, a module can contain internal processors or internal modules that perform portions of the function, operation, or sequence of operations of the module.

It will be appreciated by those of ordinary skill in the art that the illustrated delineation of blocks and their functionality are illustrative only and that implementation of the stall detector 30 can be varied according to design considerations. Further, while electronic circuits shown in figures herein may be shown in the form of analog blocks or digital blocks, it will be understood that the analog blocks can be replaced by digital blocks that perform the same or similar functions and the digital blocks can be replaced by analog blocks that perform the same or similar functions. Analog-to-digital or digital-to-analog conversions may not be explicitly shown in the figures, but should be understood.

It will also be appreciated by those of ordinary skill in the art that components of the motor control system 10 can be implemented in various forms. For example, in some embodiments, the motor control system or parts thereof are implemented in an integrated circuit (IC).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A motor control system for controlling operation of a motor having a plurality of windings, the motor control system comprising:
    a gate driver to provide a control signal to one or more switching elements controlling a voltage applied to the plurality of windings; and
    a controller configured to generate a PWM signal based on a received demand signal for coupling to the gate driver, wherein the controller comprises a d-axis control loop configured to generate an applied d-axis voltage and a q-axis control loop configured to generate an applied q-axis voltage, wherein the controller comprises:
        an observer configured to generate a speed estimate, an angle estimate, and an observer error representative of a difference between an actual angle and the angle estimate; and
        a startup control module configured to generate a startup d-axis voltage that provides the applied d-axis voltage during a startup interval and a startup q-axis voltage that provides the applied q-axis voltage during the startup interval, wherein the startup interval ends at a time based on the observer error, and wherein the startup q-axis voltage increases during the startup interval,
    wherein the startup interval comprises a first interval between a start time when power is applied to the motor and a dead time, a second interval between the dead time and a switch time, and a third interval between the switch time and an end time when the motor enters closed-loop operation, wherein the startup q-axis voltage increases during the first time interval and decreases during the second time interval and the third time interval.

2. The motor control system of claim 1 wherein the startup control module is further configured to continuously linearly increase the speed of the motor during the startup interval.

3. The motor control system of claim 1 wherein a voltage increment by which the startup q-axis voltage is increased during the startup interval is adjusted.

4. The motor control system of claim 3 wherein the voltage increment is adjusted based on the observer error.

5. The motor control system of claim 4 wherein the voltage increment is equal to a constant value plus the observer error.

6. The motor control system of claim 1 wherein the controller comprises a Field Oriented Control (FOC) controller.

7. The motor control system of claim 1 wherein each of the d-axis control loop and the q-axis control loop of the controller comprises a Proportional-Integral (PI) unit.

8. The motor control system of claim 1 wherein the demand signal comprises a user provided speed demand signal indictive of a desired motor speed.

9. The motor control system of claim 1 wherein the start time corresponds to a first startup q-axis voltage and wherein the dead time corresponds to a second startup q-axis voltage that is greater than the first startup q-axis voltage.

10. The motor control system of claim 9 wherein the first startup q-axis voltage and the second startup q-axis voltage are user programmable.

11. The motor control system of claim 1 wherein the dead time corresponds to a dead frequency and wherein the dead frequency is user programmable.

12. The motor control system of claim 1 wherein the switch time corresponds to a switch frequency and wherein the switch frequency is user programmable.

13. A method of controlling startup of a motor having a plurality of windings, the method comprising:
    applying a controlled voltage to the plurality of windings;
    measuring a current through the one or more of the plurality of windings; and
    generating with a Field Oriented Control (FOC) controller that comprises a d-axis control loop configured to generate an applied d-axis voltage and a q-axis control loop configured to generate an applied q-axis voltage, a PWM signal for coupling to a gate driver that is configured to apply the controlled voltage to the plurality of windings, wherein during a startup interval the applied q-axis voltage comprises a startup q-axis voltage generated by:
        applying a first applied q-axis voltage;
        incrementing a frequency;
        incrementing the applied q-axis voltage until the frequency is greater than a dead frequency, wherein the dead frequency corresponds to the applied q-axis voltage being equal to a second applied q-axis voltage that is greater than the first applied q-axis voltage;
        decrementing the startup q-axis voltage once the frequency is greater than the dead frequency and until the frequency reaches a switch frequency;
        determining if an observer error is greater than a threshold when the frequency reaches the switch frequency, wherein the observer error is representative of a difference between an angle estimate and an actual angle; and
        commencing closed-loop motor control once the observer error is less than the threshold for a predetermined interval.

14. The method of claim 13 wherein generating the PWM signal comprises generating the PWM signal to continuously linearly increase a speed of the motor during the startup interval.

15. The method of claim 13 wherein incrementing the startup q-axis voltage comprises incrementing the startup q-axis voltage by an increment that is adjustable based on the observer error.

16. The method of claim 15 wherein the increment is equal to a constant value plus the observer error.

17. A motor controller comprising:
- an observer configured to generate a speed estimate, an angle estimate, and an observer error representative of a difference between an actual angle and the angle estimate; and
- a startup control module configured to generate a startup d-axis voltage during a startup interval and a startup q-axis voltage during the startup interval, wherein the startup interval ends at a time based on the observer error, and wherein the startup q-axis voltage increases during the startup interval,
- wherein the startup interval comprises a first interval between a start time when power is applied to the motor and a dead time, a second interval between the dead time and a switch time, and a third interval between the switch time and an end time when the motor enters closed-loop operation, wherein the startup q-axis voltage increases during the first time interval and decreases during the second time interval and the third time interval.

18. The motor controller of claim 17 wherein the startup module is further configured to continuously linearly increase the speed of the motor during the startup interval.

19. The motor controller of claim 17 wherein a voltage increment by which the startup q-axis voltage is increased during the startup interval is adjusted based on the observer error.

20. The motor controller of claim 19 wherein the voltage increment is equal to a constant value plus the observer error.

* * * * *